US011579260B2

(12) United States Patent
Sly et al.

(10) Patent No.: US 11,579,260 B2
(45) Date of Patent: Feb. 14, 2023

(54) MULTIPLE OPERATIONAL MODES FOR AIRCRAFT LASER SENSING SYSTEMS

(71) Applicant: Rosemount Aerospace Inc., Burnsville, MN (US)

(72) Inventors: Jaime Sly, Savage, MN (US); Mark Sherwood Miller, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 974 days.

(21) Appl. No.: 16/135,846

(22) Filed: Sep. 19, 2018

(65) Prior Publication Data

US 2019/0170863 A1    Jun. 6, 2019

Related U.S. Application Data

(60) Provisional application No. 62/562,304, filed on Sep. 22, 2017.

(51) Int. Cl.
| | | |
|---|---|---|
| *G01S 7/484* | (2006.01) | |
| *G01S 17/933* | (2020.01) | |
| *G08G 5/00* | (2006.01) | |
| *G08G 5/06* | (2006.01) | |
| *G01S 17/95* | (2006.01) | |

(Continued)

(52) U.S. Cl.
CPC .............. *G01S 7/484* (2013.01); *B64D 47/00* (2013.01); *G01S 7/481* (2013.01); *G01S 7/4861* (2013.01); *G01S 7/497* (2013.01); *G01S 17/933* (2013.01); *G01S 17/95* (2013.01); *G08G 5/0021* (2013.01);

(Continued)

(58) Field of Classification Search
None
See application file for complete search history.

(56) References Cited

U.S. PATENT DOCUMENTS 5,157,677 A    10/1992 Narhi et al.
8,736,818 B2    5/2014 Weimer et al.
(Continued)

FOREIGN PATENT DOCUMENTS

DE    2900398 A1    7/1980
DE    3903501 A1    8/1989
(Continued)

OTHER PUBLICATIONS

Extended European Search Report for European Patent No. 18195405.8 dated Feb. 19, 2019, 9 pages.

(Continued)

*Primary Examiner* — Yuqing Xiao
*Assistant Examiner* — Benjamin Richard Hebert
(74) *Attorney, Agent, or Firm* — Kinney & Lange, P.A.

(57) ABSTRACT

A system for an aircraft includes an optical sensor, at least one aircraft sensor, and a controller. The optical sensor is configured to emit a laser outside the aircraft, and the at least one aircraft sensor is configured to sense at least one aircraft condition. The controller is configured to determine a first operational state of the aircraft based upon the at least one aircraft condition and determine a second operational state of the aircraft based on the at least one aircraft condition, and operate the optical sensor to emit the laser at a first intensity during the first operational state and a second intensity during the second operational state, wherein the second intensity is greater than the first intensity.

11 Claims, 3 Drawing Sheets

(51) Int. Cl.
*G01S 7/497* (2006.01)
*B64D 47/00* (2006.01)
*G01S 7/481* (2006.01)
*G01S 7/4861* (2020.01)

(52) U.S. Cl.
CPC ...... *G08G 5/065* (2013.01); *G01S 2007/4975* (2013.01)

(56) References Cited

U.S. PATENT DOCUMENTS

| | | | |
|---|---|---|---|
| 8,976,340 B2 | 3/2015 | Gilliland et al. | |
| 2007/0097350 A1 | 5/2007 | Halama | |
| 2007/0142980 A1* | 6/2007 | Ausman | G01C 23/00 701/3 |
| 2009/0033911 A1 | 2/2009 | Lacondemine et al. | |
| 2009/0273770 A1* | 11/2009 | Bauhahn | G01C 3/08 356/5.01 |
| 2010/0111122 A1 | 5/2010 | Pushkarsky et al. | |
| 2012/0050750 A1* | 3/2012 | Hays | G01S 17/003 356/519 |
| 2013/0100688 A1* | 4/2013 | Inokuchi | B64D 47/02 362/470 |
| 2016/0299219 A1* | 10/2016 | Suzuki | G01S 7/4865 |
| 2018/0088238 A1* | 3/2018 | Garde | G01S 17/88 |
| 2018/0188360 A1* | 7/2018 | Berger | G01S 17/42 |
| 2018/0284244 A1* | 10/2018 | Russell | G01S 7/484 |
| 2020/0217967 A1* | 7/2020 | Stoschek | G01S 7/4868 |

FOREIGN PATENT DOCUMENTS

| | | | |
|---|---|---|---|
| EP | 1783513 A2 | 9/2007 | |
| EP | 3301457 A1 | 4/2018 | |

OTHER PUBLICATIONS

European Office Action for European Patent No. 18195405.8 dated Jun. 5, 2020, five pages.
Extended European Search Report for European Patent No. 18195815.8 dated Feb. 20, 2019, 8 pages.
European Examination Report for European Patent No. 18195405.8 dated Jan. 18, 2021, four pages.

* cited by examiner

MULTIPLE OPERATIONAL MODES FOR AIRCRAFT LASER SENSING SYSTEMS

CROSS-REFERENCE TO RELATED APPLICATION

This application claims the benefit of U.S. Provisional Application No. 62/562,304 filed Sep. 22, 2017.

BACKGROUND

The present invention relates generally to laser sensing systems, and in particular to a system and method for controlling aircraft laser remote sensors.

Remote detection sensors using light detection and ranging (LIDAR) methodologies may be utilized, for example, to monitor the environment external to an aircraft. In order to address performance or availability of these systems, non-eye safe lasers may be required. Eye safety during on ground operations, taxi, takeoff, and landing phases of operation may be critical for certification of these systems.

Advisory circular guidance (e.g., ref. AC 20-183) for aircraft installed LIDAR systems recommends addressing eye safety by shuttering or turning off the laser system during on ground, taxi, takeoff, and landing phases of operation. However, this is for non-critical systems. For systems that are critical to the operation of the aircraft, this may be impractical. Critical systems may need to provide, for example, power-up built-in-test results demonstrating that the system is functional prior to flight and may also need to begin providing preliminary measurement data to support taxi and takeoff operations. Thus, it is desirable to allow laser systems to begin operation and performance of fault checking while the aircraft is on the ground.

Additionally, the laser power required to make the desired measurements for the aircraft LIDAR is typically designed for worst case conditions in order to meet data latency and performance requirements. These requirements may be driven by a corner of the flight envelope or a particular failure mode, for example. However, this may be more power than what is necessary for the majority of operation of the aircraft. It is desirable to be able to reduce the power level of the laser during aircraft operations where possible.

SUMMARY

A method of controlling a laser sensing system implemented on an aircraft, the laser sensing system configured to emit a laser, includes determining, by a controller, that the aircraft is in a first operational state; emitting, by the laser sensing system, a laser at a first operational intensity; determining, by the controller, that the aircraft is in a second operational state; and emitting, by the laser sensing system, the laser at a second operational intensity, wherein the second operational intensity is greater than the first operational intensity.

A system for an aircraft includes an optical sensor, at least one aircraft sensor, and a controller. The optical sensor is configured to emit a laser outside the aircraft, and the at least one aircraft sensor is configured to sense at least one aircraft condition. The controller is configured to determine a first operational state of the aircraft based upon the at least one aircraft condition and determine a second operational state of the aircraft based on the at least one aircraft condition, and operate the optical sensor to emit the laser at a first intensity during the first operational state and a second intensity during the second operational state, wherein the second intensity is greater than the first intensity.

A laser sensing system includes a laser emitter and a controller. The laser emitter is configured to emit a laser, and the controller is configured to control the laser emitter. The controller operates the laser sensing system in a first operating mode based upon detected conditions, and operates the laser sensing system in a second operating mode based upon the detected conditions, and controls the laser emitter to emit the laser at a first intensity during the first operating mode and a second intensity during the second operating mode, wherein the second intensity is greater than the first intensity.

DETAILED DESCRIPTION

Figure 1:
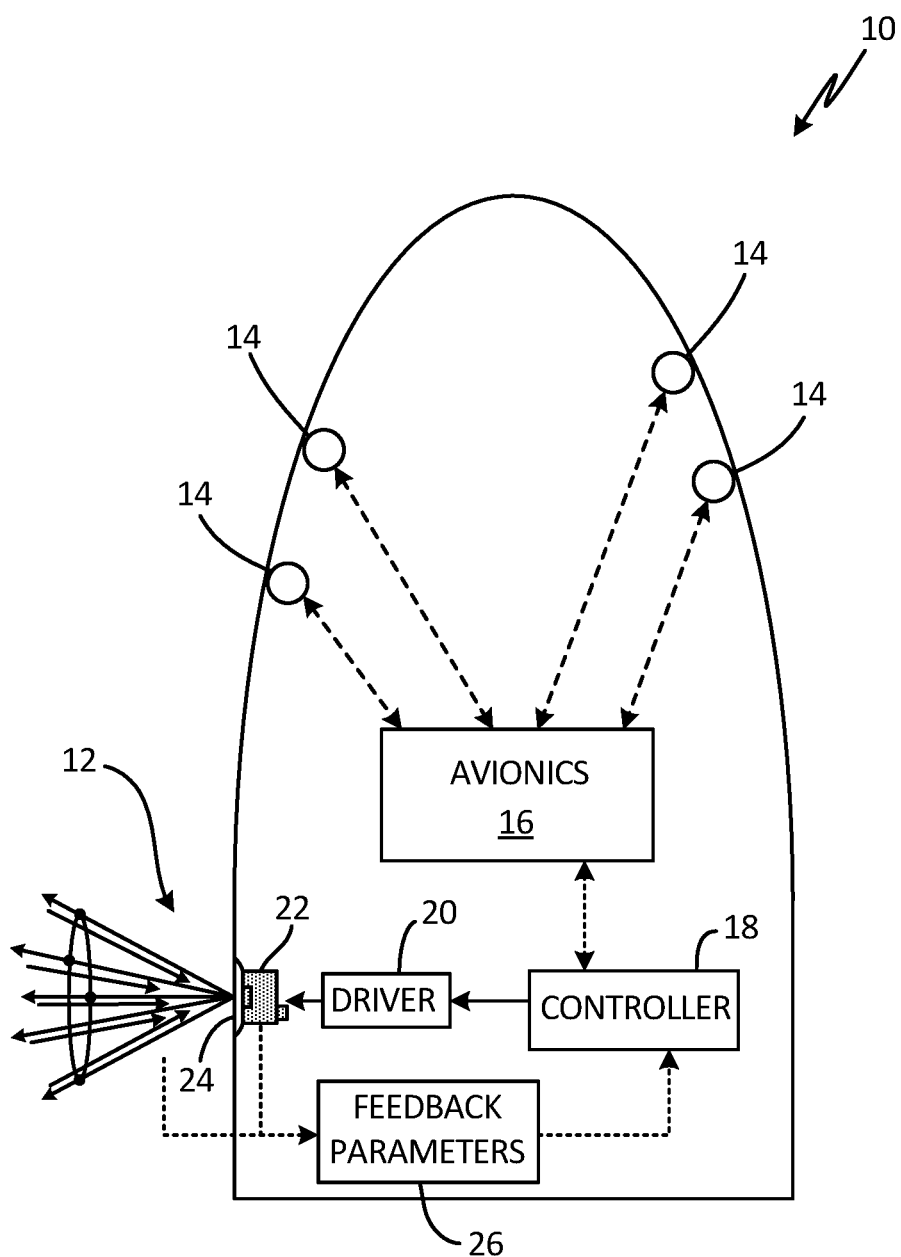
FIG. 1 is a diagram illustrating an aircraft that includes a laser sensing system.

FIG. 1 is a diagram illustrating an aircraft 10 that includes laser sensing system 12. Aircraft 10 also includes sensors 14, and avionics 16. Laser sensing system 12 may be any sensor or system that includes a laser or other optical light source and is configured to project the laser out of the aircraft into the atmosphere and capture an optical response (e.g., backscatter) of the laser from the atmosphere. For example, laser sensing system 12 may be an air data sensing system, optical icing conditions detector, or other device that utilizes light detection and ranging (LIDAR). Laser sensing system 12 may be configured to emit a laser beam out of aircraft 10 and receive and analyze backscatter of the beam in order to determine characteristics such as cloud content or air data, for example. In the embodiment illustrated in FIG. 1, laser sensing system 12 includes controller 18, driver 20, laser emitter and detector 22, and window 24. While illustrated as a single block, laser emitter and detector 22 may be separate devices such as a laser emitter and a photo-diode, for example.

Data may be collected for aircraft 10 using sensors 14, for example. Sensors 14, in conjunction with avionics 16 and/or other onboard computer systems, may be configured to determine aircraft conditions including, but not limited to, airspeed, pressure, temperature, altitude, angle of attack, weight on wheels, throttle lever angle, ground speed, aircraft coordinates (via global positioning system (GPS), for example), and many others. This data may be provided to controller 18 of laser sensing system 12 such that the sensed and determined conditions may be used by control algorithms of laser sensing system 12, for example.

Because laser sensing system 12 emits a laser beam through window 24 of aircraft 10 into the external environment, for example, regulations may require eye safety while aircraft 10 is on the ground. In the past, for non-critical lasers implemented on aircraft, eye safety was ensured by requiring the laser to be turned off or shuttered while the aircraft is on the ground. However, requiring the laser to be turned off or shuttered may not be practical in certain applications. For example, laser sensing system 12, or the system that includes laser sensing system 12, may be safety critical, requiring on-ground checks to ensure proper functionality prior to flight of aircraft 10.

Figure 2:
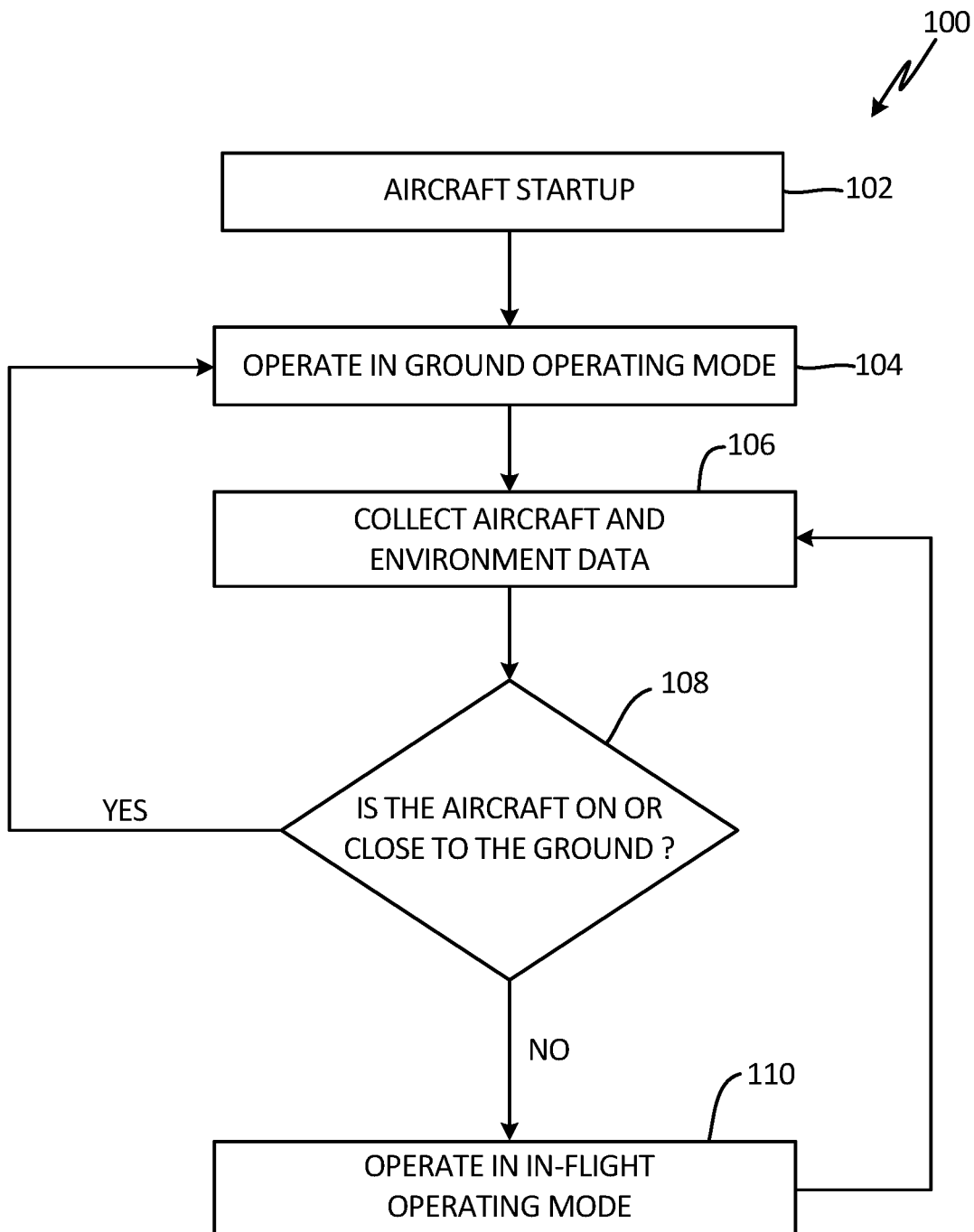
FIG. 2 is a flowchart illustrating a method of operating a laser sensing system in separate operating modes.

FIG. 2 is a flowchart illustrating method 100 of operating laser sensing system 12 in separate operating modes. For example, laser sensing system 12 may be operated in two operating modes. The first operating mode may be a ground operating mode and the second operating mode may be an in-flight operating mode. While in ground operating mode, laser sensing system 12 may be operated in a low power mode such that the laser emitted by laser sensing system 12 is at eye safe levels. Eye safety levels may be defined by the United States Food and Drug Administration (FDA) in 21 CFR 1040.10 and 21 CFR 1040.11, for example, or by other regulatory entities.

At step 102, aircraft 10 is started up or otherwise prepared for flight. At startup of aircraft 10, laser sensing system 12 may enter a default operating mode. For example, at step 102, aircraft 10 may be parked at the gate and preparing for an upcoming flight. In the embodiment illustrated in FIG. 2, the default operating mode of laser sensing system 12 is the ground operating mode and thus, following startup of aircraft 10, at step 104, laser sensing system 12 operates in ground operating mode. At step 106, aircraft and environment data is collected. For example, sensors 14, avionics 16, and/or other onboard systems may be utilized to collect information such as, among others, airspeed, groundspeed, weight on wheels, throttle level angle, and GPS data.

At step 108, it is determined if aircraft 10 is operating in a certain operating mode or phase. For example, the operating mode may be that aircraft 10 is operating on the ground. This determination may be made by avionics 16, controller 18, and/or any other computer system onboard aircraft 10. The determination may be made using data obtained during step 106. For example, weight on wheels, altitude, throttle level angle, or other sensed conditions may be used to determine that aircraft 10 is on the ground. If it is determined by controller 18 or another computer system that aircraft 10 is on the ground, method 100 returns to step 104 and laser sensing system 12 begins, or continues, operating in ground operating mode.

While in ground operating mode, laser sensing system 12 may be operated in a low power mode. In low power mode, laser sensing system 12 may ensure that the laser emitted by laser sensing system 12 is emitted at eye safety levels. These levels may be defined by FDA regulations 21 CFR 1040.10 and 21 CFR 1040.11, for example, or by requirements defined by other regulatory entities. While operating at lower power, laser sensing system 12 may require longer integration times and/or may have reduced accuracy. However, this may be acceptable to perform ground checks of laser sensing system 12, and/or begin collecting data while aircraft 10 is on the ground.

If aircraft 10 is not on the ground, as determined at step 108, method 100 proceeds to step 110 and laser sensing system 12 is operated in an in-flight operating mode. During in-flight operating mode, the laser of laser sensing system 12 may be operated at a full operational power level. Because aircraft 10 is in flight, the laser of laser sensing system 12 may be operated at a level that is above eye safety levels, for example. During in-flight operating mode, the power to the laser of laser sensing system 12 may be varied as described with respect to FIG. 3. If laser sensing system 12 is an air data sensing system, for example, the power level may be adjusted based upon the total received return intensity at detector 22 while laser sensing system 12 is operated in the in-flight mode. Method 100 may be repeated for the entirety of operation of aircraft 10.

While described as a ground operating mode and an in-flight operating mode, additional or alternative operational modes may be defined for laser sensing system 12. For example, it may be desirable for aircraft 10 to reach a certain altitude prior to emitting laser energy above eye safe levels. In another embodiment, the second operational mode may be beyond a speed threshold. For example, the nominal ocular hazard distance (NOHD) and/or dwell time of the laser may be such that while the aircraft is accelerating for takeoff, it can be guaranteed that no persons will be within a range of the laser of sensing system 12 such that eye safety is an issue. Thus, laser sensing system 12 may be able to operate in a normal operating mode prior to takeoff of aircraft 10, following detection of a threshold groundspeed.

Any method for reducing the intensity of the laser emitted by laser sensing system 12 may be utilized. For example, if laser sensing system 12 employs a single stage laser, controller 18 may adjust a drive current provided to driver circuit 20. This current may be selected such that it is guaranteed that the laser emitted by laser sensing system 12 is at eye safety levels. Eye safety levels may be assessed as a radian power defined as eye-safe at the window or other surface of laser sensing system 12, or may be assessed as eye-safe at a reasonable NOHD around laser sensing system 12, for example.

During normal operation of laser sensing system 12, such as during step 110 of method 100, the power provided to drive the laser of laser sensing system 12 may be continuously adjusted based upon the needs of the system. For example, laser sensing system 12 may be an air data sensing system or other optical sensor configured to measure characteristics of the atmosphere external to aircraft 10. For LIDAR air data sensing systems, for example, a stronger return signal (e.g., molecular or aerosol backscatter) is typically available at the receiving optics of the laser sensing system when aircraft 10 is at lower altitudes. This is due to the increased density of the molecules or greater concentration of aerosols in the air at lower altitudes.

Emitter and detector 22 may include a photo-diode, for example, configured to receive the backscatter and convert the backscatter into an electronic signal for controller 18. At lower altitudes, increased backscatter return increases the intensity of the light received at the detector. If there is too much return, the detector could saturate, driving error into the method of measurement. In another example, detector 22 may include a photon counter. When there are a large number of photons, a detection circuit that utilizes a photon counter may miss some of the received photons. Thus, it is desirable for controller 18 to implement a control algorithm to optimize the signal intensity for the detection circuit.

Additionally, there may be flight phases for which a faster measurement by laser sensing system 12 is required. In this situation, the power for laser sensing system 12 may be increased to increase the signal intensity such that laser sensing system 12 may calculate the sensing system results with a lower latency. The power may then be decreased for flight phases for which this performance is not required, tolerating longer latencies in favor of reduced power.

Figure 3:
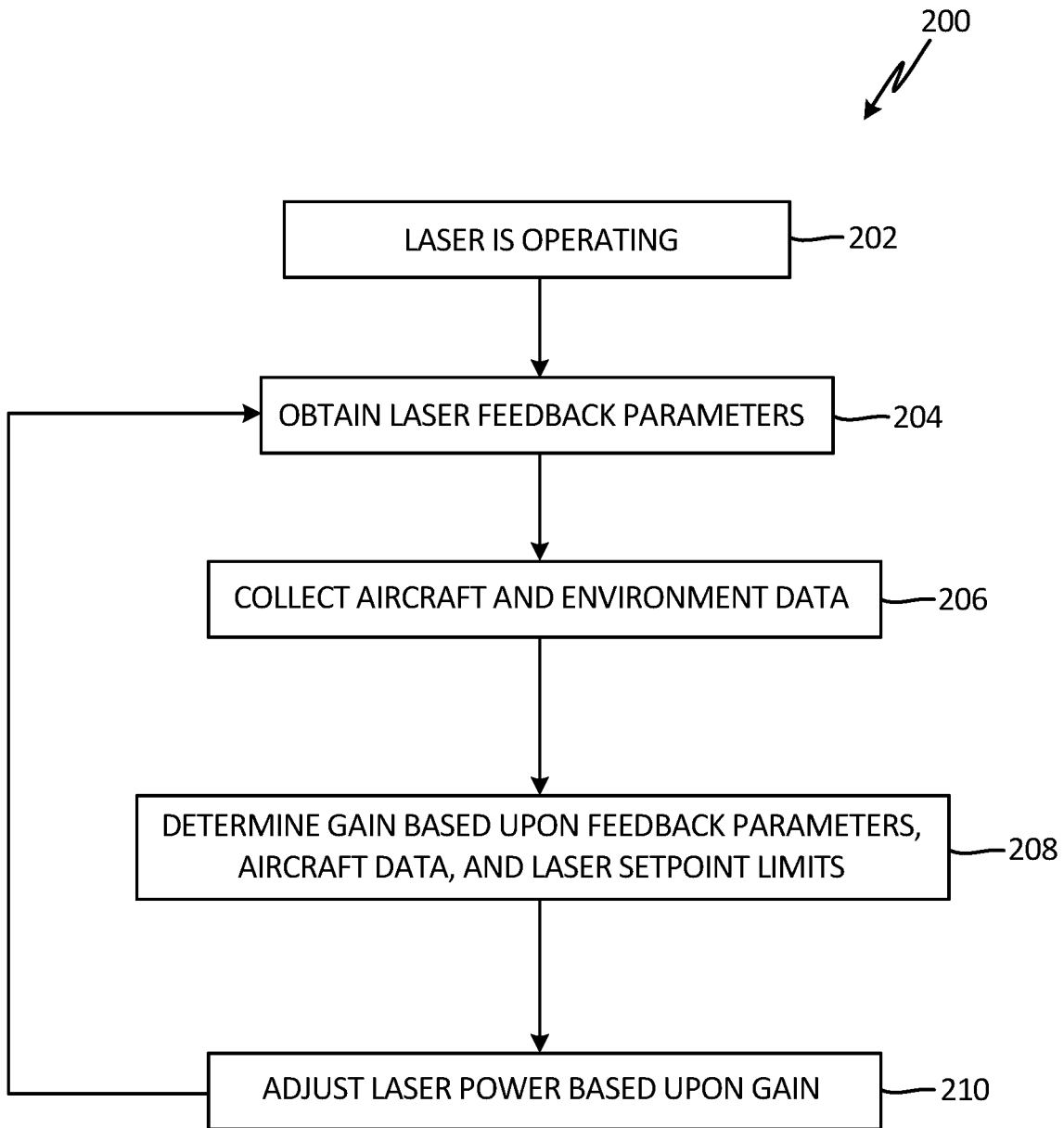
FIG. 3 is a flowchart illustrating a method of providing automatic gain control for a laser sensing system.

FIG. 3 is a flowchart illustrating method 200 of providing automatic gain control for laser sensing system 12. For the embodiment illustrated in FIG. 3, laser sensing system 12 is a laser air data sensing system. In other embodiments, laser sensing system 12 may be any other aircraft optical sensor. At step 202, aircraft 10 is operating and laser sensing system 12 is performing normal system operation. For example, laser sensing system 12 may be in an in-flight operating mode, as described above for step 110 of method 100 (FIG. 2). At step 204, feedback parameters 26 (FIG. 1) are obtained by controller 18.

Feedback parameters may include, among others, signal intensity and signal-to-noise ratio. These parameters may be measured at the detector 22. For example, a signal-to-noise ratio may be determined from values obtained from a detector, such as a photo-diode, of laser sensing system 12. A reference intensity, or a known background noise value, may be compared with a current detector output to determine the signal-to-noise ratio. This determination may be made by controller 18 or other circuitry of laser sensing system 12. The intensity of the laser may be directly measured at the output of the laser emitter, or external to optics of laser sensing system 12. Thus, the adjustment of power to laser sensing system 12 may also be utilized to account for a dirty window or other situation in which the optical transmission of the laser is impeded.

The laser power may also be adjusted based upon aircraft and environmental data. At step 206, aircraft and environmental data may be collected, for example, using sensors 14, avionics 16, and/or other onboard systems. This data may include, among others, aircraft velocity, temperature, pressure, flight phase, and altitude.

At step 208, a gain for the laser of laser sensing system 12 is determined based upon the factors determined at steps 204 and 206. The gain may be set with respect to the maximum laser power, for example. At step 210, the laser power is adjusted based upon the determined gain. The laser power may be controlled by controller 18, for example, by controlling a current to the laser for a single stage laser, or using an amplifier stage for other laser types, such as master-slave lasers. Any other method of controlling the power to the laser may be utilized. The laser power may also be controlled to remain within power limits of the laser, for example. These limits may be set based upon a maximum power the laser can handle, and a power that results in minimum signal intensity required for laser sensing system 12 to operate.

Method 200 may be utilized to account for varying molecular density at different altitudes, for example. Particulate count can also cause an increase in reflected energy received by emitter and detector 22. However, particulates generally reflect energy at very specific spectral widths, while molecules broaden the spectral content. Thus, the reflected energy from particulates may be filtered by wavelength to obtain the molecular reflections. With the particulate reflection filtered, method 200 may be utilized to adjust the power provided to laser sensing system 12 to account for the present molecular content of the atmosphere.

DISCUSSION OF POSSIBLE EMBODIMENTS

The following are non-exclusive descriptions of possible embodiments of the present invention.

A method of controlling a laser sensing system implemented on an aircraft, the laser sensing system configured to emit a laser, includes determining, by a controller, that the aircraft is in a first operational state; emitting, by the laser sensing system, a laser at a first operational intensity; determining, by the controller, that the aircraft is in a second operational state; and emitting, by the laser sensing system, the laser at a second operational intensity, wherein the second operational intensity is greater than the first operational intensity.

The method of the preceding paragraph can optionally include, additionally and/or alternatively, any one or more of the following features, configurations and/or additional components:

A further embodiment of the foregoing method, wherein determining, by the controller, that the aircraft is in the first operational state includes determining that the aircraft is on the ground.

A further embodiment of any of the foregoing methods, wherein emitting, by the laser sensing system, the laser at the first operational intensity includes emitting the laser at an eye safe level.

A further embodiment of any of the foregoing methods, wherein determining, by the controller, that the aircraft is in the second operational state includes determining that the aircraft is in flight.

A further embodiment of any of the foregoing methods, wherein the laser sensing system is a light detection and ranging (LIDAR) sensing system.

A further embodiment of any of the foregoing methods, wherein determining, by the controller, that the aircraft is in the first operational state comprises obtaining characteristics of the aircraft to determine the first operational state.

A further embodiment of any of the foregoing methods, wherein obtaining the characteristics of the aircraft includes receiving, by the controller, data obtained by at least one sensor implemented onboard the aircraft.

A further embodiment of any of the foregoing methods, wherein determining, by the controller, that the aircraft is in the second operational state includes determining that the aircraft is in the second operational state using the obtained characteristics of the aircraft.

A system for an aircraft includes an optical sensor, at least one aircraft sensor, and a controller. The optical sensor is configured to emit a laser through a window of the aircraft, and the at least one aircraft sensor is configured to sense at least one aircraft condition. The controller is configured to determine a first operational state of the aircraft based upon the at least one aircraft condition and determine a second operational state of the aircraft based on the at least one aircraft condition, and operate the optical sensor to emit the laser at a first intensity during the first operational state and a second intensity during the second operational state, wherein the second intensity is greater than the first intensity.

The system of the preceding paragraph can optionally include, additionally and/or alternatively, any one or more of the following features, configurations and/or additional components:

A further embodiment of the foregoing system, wherein the first operational state is an on-ground state for the aircraft.

A further embodiment of any of the foregoing systems, wherein the first intensity comprises an eye safe intensity.

A further embodiment of any of the foregoing systems, wherein the second operational state is an in-flight state of the aircraft.

A further embodiment of any of the foregoing systems, wherein the laser sensing system is a light detection and ranging (LIDAR) sensing system.

A laser sensing system includes a laser emitter and a controller. The laser emitter is configured to emit a laser, and the controller is configured to control the laser emitter. The controller operates the laser sensing system in a first operating mode based upon detected conditions, and operates the laser sensing system in a second operating mode based upon the detected conditions, and controls the laser emitter to emit the laser at a first intensity during the first operating mode and a second intensity during the second operating mode, wherein the second intensity is greater than the first intensity.

The laser sensing system of the preceding paragraph can optionally include, additionally and/or alternatively, any one or more of the following features, configurations and/or additional components:

A further embodiment of the foregoing sensing system, wherein the first operating mode is an on-ground mode for an aircraft.

A further embodiment of any of the foregoing sensing systems, wherein the first intensity comprises an eye safe intensity.

A further embodiment of any of the foregoing sensing systems, wherein the second operating mode is an in-flight state for the aircraft A further embodiment of any of the foregoing sensing systems, wherein the controller is configured to receive characteristics of the aircraft to determine the aircraft is on the ground.

A further embodiment of any of the foregoing sensing systems, wherein the controller is configured to determine the aircraft is in-flight using the characteristics of the aircraft.

A further embodiment of any of the foregoing sensing systems, wherein the laser sensing system is a light detection and ranging (LIDAR) sensing system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of controlling a laser air data sensing system implemented on an aircraft, the laser air data sensing system configured to emit a laser beam, the method comprising:
   providing power to the aircraft;
   operating the laser air data sensing system in a default operational state;
   determining, by a controller, that the aircraft is in a first operational state, wherein the first operational state is a ground operational state, wherein the first operational state is the default operational state and wherein determining, by the controller, that the aircraft is in the first operational state comprises:
      obtaining characteristics of the aircraft to determine the aircraft is in the first operational state comprising;
      receiving, by the controller, data obtained by at least one sensor implemented onboard the aircraft, wherein the data comprises at least one of pressure, temperature, angle of attack, and throttle lever angle;
   emitting, by the laser air data sensing system, a laser beam at a first operational intensity, wherein the first operational intensity is an eye safe level;
   performing, by the laser air data sensing system in the first operational state, a ground check to ensure proper functionality of the laser air data sensing system by emitting a laser beam at the first operational intensity into an atmosphere surrounding the aircraft and receiving backscatter of the laser beam from the atmosphere;
   determining, by the controller, that the aircraft is in a second operational state, wherein the second operational state is an in-flight operational state;
   emitting, by the laser air data sensing system, the laser beam at a second operational intensity, wherein the second operational intensity is greater than the first operational intensity.

2. The method of claim 1, wherein determining, by the controller, that the aircraft is in the first operational state comprises determining that the aircraft is on the ground.

3. The method of claim 2, wherein determining, by the controller, that the aircraft is in the second operational state comprises determining that the aircraft is in flight.

4. The method of claim 1, wherein the laser air data sensing system is a light detection and ranging (LIDAR) air data sensing system.

5. The method of claim 1, wherein determining, by the controller, that the aircraft is in the second operational state comprises determining that the aircraft is in the second operational state using the obtained characteristics of the aircraft.

6. A system for an aircraft, the system comprising:
   an optical sensor configured to emit a laser beam through a window of the aircraft;
   at least one aircraft sensor configured to sense at least one aircraft condition wherein the at least one aircraft sensor senses at least one of pressure, temperature, angle of attack, and throttle lever angle; and
   a controller configured to determine a first operational state of the aircraft based upon the at least one aircraft condition and determine a second operational state of the aircraft based on the at least one aircraft condition, wherein the first operational state is an on-ground state, wherein the first operational state is a default operational state used on startup of the system, and wherein the second operational state is an in-flight state;
   wherein the controller is further configured to:
      operate the optical sensor to emit the laser beam at a first intensity during the first operational state and a second intensity during the second operational state, and wherein the second intensity is greater than the first intensity; and
      operate the optical sensor to emit a laser beam at the first operational intensity to a perform ground check to ensure proper functionality of the laser air data sensing system by emitting a laser beam at the first operational intensity into an atmosphere surrounding the aircraft and receiving backscatter of the laser beam from the atmosphere.

7. The system of claim 6, wherein the first intensity comprises an eye safe intensity.

8. The system of claim 6, wherein the laser air data sensing system is a light detection and ranging (LIDAR) air data sensing system.

9. A laser air data sensing system comprising:
   a laser emitter configured to emit a laser beam;
   a controller configured to control the laser emitter, wherein the controller operates the laser air data sensing system in a first operating mode based upon detected conditions, and operates the laser air data sensing system in a second operating mode based upon the detected conditions; and
   at least one sensor configured to determine at least one characteristic of an aircraft;
   wherein the first operating mode is an on-ground mode for the aircraft and is a default mode run on startup of the system;

wherein the controller is configured to receive characteristics of the aircraft from the at least one sensor to determine the aircraft is on the ground, the characteristics comprising at least one of pressure, temperature, angle of attack, and throttle lever angle;

wherein the second operating mode is an in-flight mode for the aircraft;

wherein the controller controls the laser emitter to emit the laser beam at a first intensity during the first operating mode and a second intensity during the second operating mode, wherein the second intensity is greater than the first intensity;

wherein the first intensity is an eye-safe intensity; and wherein the laser air data sensing system performs a ground check while in the first operational state by emitting a laser beam at the first operational intensity into an atmosphere surrounding the aircraft and receiving backscatter of the laser beam from the atmosphere.

10. The laser air data sensing system of claim 9, wherein the controller is configured to determine the aircraft is in-flight using the characteristics of the aircraft.

11. The laser air data sensing system of claim 9, wherein the laser air data sensing system is a light detection and ranging (LIDAR) air data sensing system.

* * * * *